(12) United States Patent
de Souza et al.

(10) Patent No.: US 7,964,169 B2
(45) Date of Patent: Jun. 21, 2011

(54) MOLECULAR CONVERSION PROCESSING OF GREENHOUSE GASES OF GLOBAL WARMING EFFECT AND CONVERSION UNITS EMPLOYING A SOLID PARTICLE TRAP

(76) Inventors: Ivan Gonçalves de Souza, Florianopolis (BR); Nito Angelo Debacher, Florianopolis (BR)

( * ) Notice: Subject to any disclaimer, the term of this patent is extended or adjusted under 35 U.S.C. 154(b) by 74 days.

(21) Appl. No.: 12/445,910

(22) PCT Filed: May 15, 2007

(86) PCT No.: PCT/BR2007/000116
§ 371 (c)(1),
(2), (4) Date: Apr. 16, 2009

(87) PCT Pub. No.: WO2008/098324
PCT Pub. Date: Aug. 21, 2008

(65) Prior Publication Data
US 2010/0296989 A1  Nov. 25, 2010

(30) Foreign Application Priority Data

Feb. 15, 2007 (BR) ...................................... 0700517

(51) Int. Cl.
*B01D 53/62* (2006.01)
*B01D 53/74* (2006.01)
*B01D 50/00* (2006.01)

(52) U.S. Cl. ............. 423/220; 423/215.5; 423/DIG. 10; 422/129; 422/186.21; 422/187; 204/164; 204/73; 96/15; 95/57

(58) Field of Classification Search ............... 423/220, 423/215.5, DIG. 10; 422/129, 186.21, 187; 204/164, 73; 96/15; 95/57
See application file for complete search history.

(56) References Cited

U.S. PATENT DOCUMENTS

| 4,189,371 | A | 2/1980 | Maa et al. |
| 4,190,636 | A | 2/1980 | Schmerling et al. |
| 5,827,012 | A | 10/1998 | Circeo |
| 6,153,158 | A * | 11/2000 | Flannery et al. ............. 423/210 |
| 6,374,595 | B1 | 4/2002 | Penetrante et al. |

FOREIGN PATENT DOCUMENTS

| BR | 9500855-1 A | 4/1997 |
| BR | 0205677 | 8/2004 |
| BR | 0301592 | 5/2005 |

(Continued)

OTHER PUBLICATIONS

Shukman, David, "Sharp Rise in CO2 levels recorded", http://news.bbc.co.uk/2/hi/science/4803460.stm; Mar. 14, 2006.

(Continued)

*Primary Examiner* — Timothy C Vanoy
(74) *Attorney, Agent, or Firm* — Hedman & Costigan, P.C.; Kathleen A. Costigan

(57) ABSTRACT

Molecular conversion processing of greenhouse gases of global warming effect and conversion units employing a solid particle trap. This is an industrial process capable of changing the chemical composition of the greenhouse gases from any source, such as the internal combustion engine, factory chimney and others, through the conversion of gas molecules to form new compounds such as clean gases. This is done by molecular conversion processing conversion unit with a solid particle trap, consisting of a plasma conversion chamber that produces a plasma jet, and an electrostatic filter for the collection of solid particles.

19 Claims, 1 Drawing Sheet

FOREIGN PATENT DOCUMENTS

| | | | |
|---|---|---|---|
| JP | 4-22416 A | * | 1/1992 |
| JP | 2003326155 | | 11/2003 |
| JP | 2005021853 | | 1/2005 |
| WO | WO2004060538 | | 7/2004 |
| WO | WO2005046843 | | 5/2005 |
| WO | WO2006021945 | | 3/2006 |
| WO | WO2008055326 | | 5/2008 |

OTHER PUBLICATIONS

Stepanovsky, M., International Search Report, PCT/BR2007/000116; Austrian Patent Office, Oct. 25, 2007.

* cited by examiner

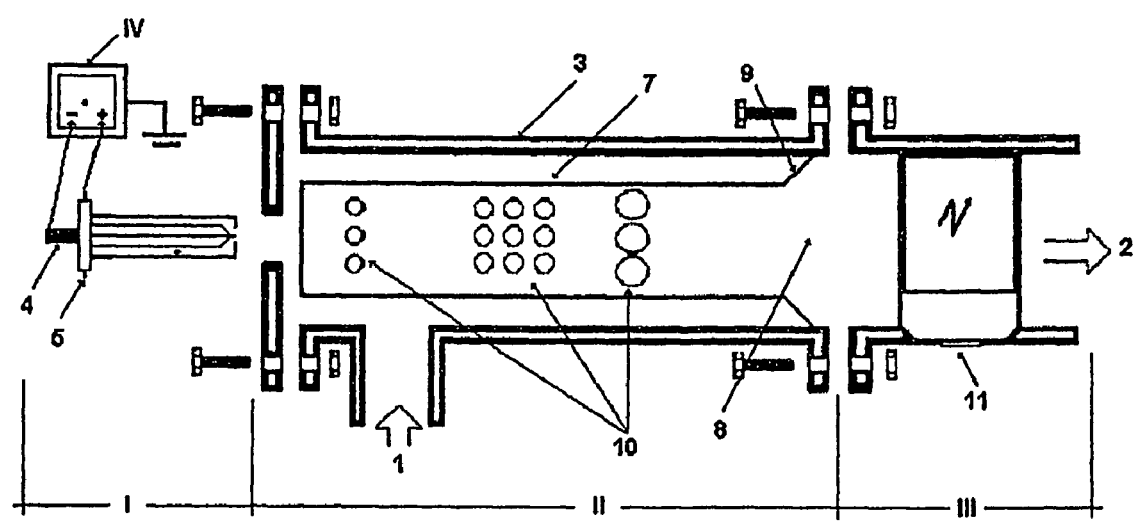
FIGURA 1

MOLECULAR CONVERSION PROCESSING OF GREENHOUSE GASES OF GLOBAL WARMING EFFECT AND CONVERSION UNITS EMPLOYING A SOLID PARTICLE TRAP

This is about a process of conversion of gas molecules through thermal plasma technology, an industrial process capable of changing the chemical composition of greenhouse gases emitted as exhaust from internal combustion engines, factory chimneys, etc. This process of conversion degrades or decomposes the gas molecules and forms new substances, e.g. carbon dioxide ($CO_2$), which is one of the main components of greenhouse gases, and whose conversion products, by this process are solid carbon and gaseous oxygen ($O_2$). Molecular conversion unity with a solid particle trap consists of plasma combustion chamber and an electrostatic filter for the collection of solid particles. The plasma combustion chamber has a plasma torch that produces a plasma jet or ionized gas formed by discharge between a cathode and an anode.

THE TECHNICAL STATE

One of the most serious problems faced by man today is the environmental pollution, which result mainly from human and industrial activities. Fossil fuel burning (such as petrol, coal, and natural gas) is one of the main reasons for the increase of carbon dioxide ($CO_2$) in the atmosphere of the planet. About 24,000 million tons of $CO_2$ have been released annually, the equivalent of 6,500 million tons of carbon per year. The concentration of carbon dioxide in the atmosphere, measured by Mauha Loa Observatory, Hawaii, in January of 2007, was 0.0383% in volume (383 ppm/v): 105 ppm/v of 38% over the average of the observed values up to 1950. The average temperature of Earth's atmosphere is kept constant due to the physical and chemical properties of certain gaseous molecules called greenhouse gases, such as $CO_2$. If the concentration of such gases changes there will also be changes in the planet's temperature. The main greenhouse gases causing global warming are: water vapor, which causes about 36 to 70%; carbon dioxide ($CO_2$), which causes about 9 to 26%; methane ($CH_4$), which causes about 4 to 9%; and finally the ozone ($O_3$), which causes about 3 to 7%.

Nitrous Oxide ($N_2O$) and CFC's like chlorofluorocarbons ($CF_xCl_x$) are other greenhouse gases of less concentration in the atmosphere. In the face of such a critical situation, researchers all over the world seek technologies to control and retain greenhouse gas emissions. The patent documents PI8100960-7, PI9500855-1, PI0205677-1, PI0301592-0, PI0305789-5, PI0317946-0, JP2003326155 and PI0604646-0 describe equipment and processes of carbon dioxide gas absorption in the atmosphere. The dominant technology today searches for a solution by improving the chemical reaction processes. But it should be noted that there exist no industrial installation using thermal plasma technology aimed at conversion of greenhouse gas molecules and production of new substances. Information concerning this invention may be accessed at http.//www.cmdl.noaa.gov/ccgg/trends/, (Jan. 18, 2007), and in "Shukman, David (14 Mar. 2006). Sharp rise in $CO_2$, levels Recorded. BBC News".

In relation to thermal plasma technology, it is necessary to consider different ways of producing plasma, and any such choice depends on the aim of the application. The most used methods are inductive coupling plasma (ICP) and DC arc plasma (direct current). Radio frequency produces ICP, which is used mainly for analytical purposes. It is formed by a gas flow, normally argon gas, which crosses an area with an induction coil fed by a radio-frequency generator system. The induction coil comprises 2 or 4 inner water-cooled turns. This kind of plasma is also used for liquid chemical waste treatment. The waste is injected into the center of the torch where the temperatures are higher, and this contributes to its total destruction.

DC Arc Plasma: When the gas flows between two electrodes under a potential difference and high current in the presence of some negative or positive charge carriers, an arc is established between the electrodes forming direct current (DC) plasma or alternating current (AC) plasma. The electric arc may be free (arc welding or arc furnace) or confined (in a plasma torch). The process of heat exchange between the arc and the environmental gas occurs by natural convection in the free arc. In the confined arc, the exchange takes place by forced convection, which is much more efficient than the natural one. Due to that efficiency, the temperature in the confined arc (20,000K) is much higher than the temperature in the free arc (3000K). Despite the possibility of applying different types of plasma generation in this process, the DC arc plasma system will be used to describe it.

The current state of the technique may be referenced in relevant documents such as:
1. CUBAS, A. L. V.; CARASEC, E. R.; DEBACHER, N. A.: SOUZA, I. G., Development of a DC-Plasma Torch for Decomposition on Organochlorine Compounds. Journal of the Brazilian Chemical Society, Br., v. 16, n. 3B, p. 531-534, 2005.
2. CUBAS, A. L. V.; CARASEC, E. R.; DEBACHER, N. A.; SOUZA, I. G. Use of Solid Phase Microextraction to Monitor gases Resulting from Thermal Plasma Pyrolysis. Chromatography, Germany, v. 60, n. ½, p. 85-88, 2004.
3. STALEY, L. Site Demonstration of Retech Plasma Centrifugal Furnace: The Use of Plasma to Vitrify Contaminated Soil Air & management Association, v. 42, n10, p. 1372-1376 1992.
4. BONIZZONI, G.: VASSALO, E. Plasma Physics and Technology: Industrial Applications. Vaccum. v. 64. p. 327-336 January 2002.
5. BOULOS, M.; FAUCHAIS, P.; PFENDER, E. Fundamentals and Applications. Thermal plasma, v. 1, 1995.
6. IWAO, T.; INABA T. Treatment of Waste by dc Arc Discharge Plasma. IEEE Transactions on Dielectrics and Electrical Insulation, v. 7, $n_o$ 5, p. 684-692. October 2000.

DESCRIPTION OF THE INVENTION

Molecular Conversion Processing of Greenhouse Gases is based on the conversion of greenhouse substances (molecules) through thermal plasma. The conversion of such molecules produces physical-chemical substances, which are totally different from the original ones, such as solid carbon and non-greenhouse gases.

The conversion process is carried out through a plasma torch, a plasma conversion chamber and an electrostatic filter. For a better explanation, we may use the example of carbon dioxide ($CO_2$), one of the main components of the greenhouse effect, whose conversion products by this process are solid carbon (C) and gaseous oxygen ($O_2$). The molecular conversion unity with a solid particle trap consists of a plasma conversion chamber and an electrostatic filter for the collecting of solid particles. The plasma conversion chamber is provided with a plasma torch that produces a plasma jet or ionized gas formed by discharge between the cathode and the anode.

The operation of thermal conversion processing of greenhouse gases is set up as follows. A conversion chamber is provided with a plasma arc torch that produces a plasma jet or ionized gas at temperatures around 10,000 K, formed by discharge between the cathode and the anode. The plasma torch is connected to a high-current electronic Source with a varied capacity, according to the gas or mixture of gases to be ionized. The equipment has a collector filter of solid particles. The molecular conversion process by thermal plasma follows two step. In the first step, the high temperature generated by ionized gas (plasma) breaks the chemical bonds of the molecules and forms highly reactive and unstable free radicals, which in a second step, during the cooling of the gaseous mixture, spontaneously recombine and form new substances of less molecular weight in an entropically favorable process.

Illustrated Description

To complement the verbal description of the invention, and for an easier comprehension of its characteristics, it is presented the FIG. 1 is presented as a mere illustration. The FIG. shows the extended diagram of the molecular conversion unity of greenhouse gases with a solid particle trap composed of modules: plasma torch (I); plasma conversion chamber (II); electrostatic filter (III); and high-current electronic source (IV).

Detailed Description of the Process and the Unit

The required equipment for the implementation of the "Thermal Conversion process of Greenhouse Gases" contains a High-Current Electronic Source (IV) to provide energy to the process, a Plasma Torch (II) and Plasma Conversion Chamber (II) for the mixture and pyrolytic conversion of the effluent gases, and an Electrostatic Filter (III) to separate the gaseous mixture and the solid particles.

The High-Current Electronic Source (IV) presents the following features. It offers power from 10 to 20 KW and has a high frequency electronic ignitor to establish the electric arc in order to form the plasma.

The plasma conversion may be carried out both directly and indirectly. In the direct way, the greenhouse gases are introduced between the electrodes with the torch maintenance gas. In the indirect way, the greenhouse gases are closely mixed with the plasma jet in the Conversion Chamber. In this Patent, the indirect process will be described. Here, the plasma conversion chamber (II) is formed by a plasma torch (I) of a non-transferred arc type and a tubular conversion chamber (7) of a direct flow type. The plasma conversion chamber (II) is the principal component of the molecular conversion. The mechanism of pyrolysis or molecular conversion takes place in the chamber, and for a better efficiency a close mixture between the gases that go into the chamber (1) and the plasma jet is necessary. For a better visualization of the modules (I, II, III, and IV), FIG. 1 presents an exploded view of the Molecular Conversion Unit of greenhouse gases. The direct current plasma torch (I) of a non-transferred arc has a central tungsten electrode which operates as a cathode (electron emitter) and a brass body (5), the anode, which operates as a electron collector. The torch must be water-cooled. The plasma is formed when gases, such as argon, nitrogen and air among others, flow between the two electrodes under a certain potential difference and high-current. The electric arc is first produced by a high frequency electronic ignitor (IV) that generates the first charge carriers. The REED Vortex or plasma jet is maintained by the high potency from the high voltage source (IV), stabilized by the gas flow between the electrodes which is ionized to form the previously-mentioned plasma jet at the outlet of the torch (I). These torches can reach temperatures of about 10,000 K in an appropriate environment able to molecularly convert any substance.

The Tubular Conversion Chamber (II) of Direct Flow comprises a surrounding tube (3) with a lateral gas feed tube and a central flame tube (7). The surrounding tube (3) is made of steel and it forms the real body of the Conversion chamber (II). The flame tube (7) is a cylinder comprising a free opening (8) at its back with a slight salience (9) to support itself in the interior of the surrounding tube (3). The torch (I) must be screwed into the frontal side of the flame tube (7). It is a high heat-resistant steel tube (7) that's needs to be completely surrounded by the surrounding tube. The flame tube (7) is placed exactly in the center of the enclosure surrounded by the tube (3). The flame tube (7) has a series of holes along its body which are functionally invariable and different from each other. When penetrating the chamber, the gases form a laminar flow, but when the gases enter through the different holes (10) they become a turbulent just after getting into the flame chamber (7). The turbulence is purposely provoked in order to guarantee a perfect mixture of gases with the REED Vortex or plasma jet.

The plasma conversion chamber (II) is coupled to an Electrostatic Filter (III). Some gases such as oxygen and nitrogen, as well as solid particles such as carbon and sulphur, will result from the molecular conversion. Thus, solid particle—carbon and sulphur resulting from $CO_2$ and $SO_x$ decomposition—will be removed from the gaseous flow in the electrostatic filter, similar to those that are available commercially. Electrostatic filters are the most appropriate for the gas outlet since they offer minimal resistance to the gaseous flow and are able to efficiently retain micro-pulverized material. The solid particles retained in the filter (III) will be removed to a container (11) placed at the bottom of this filter (III). At the outlet (2), the effluent gases should be free of greenhouse gases and solid particles.

The constructive form of the unit enables its installation next to the generator source. In addition, the unit presents a simple method of manufacturing of its elements. These characteristics make viable its large-scale industrial applications, enabling the reduction of pollutant gases such as carbon dioxide, one of the main greenhouse gases causing global warming.

The invention claimed is:

1. A molecular conversion process for the processing of greenhouse gases comprising the steps of molecularly converting greenhouse gases to form clean gases by thermal plasma conversion of the gaseous mixture in one or more conversion units and retaining the solid particles resulting from the one or more conversion units, wherein the one or more conversion units comprise one or more solid particle traps.

2. The molecular conversion process of claim 1, wherein the one or more solid particle traps comprise a first plasma conversion chamber, a second plasma conversion chamber and an electrostatic filter to collect solid particles.

3. The molecular conversion process of claim 2 wherein the second plasma conversion chamber comprises a plasma torch of non-transferred arc type inside a tubular conversion chamber of direct flow type.

4. The molecular conversion process of claim 3 wherein the plasma torch is fed by a high-current electronic source at a power of 10 to 20 KW and wherein the plasma torch further comprises a high frequency electronic ignitor.

5. The molecular conversion process of claim 4 wherein the tubular conversion chamber of direct flow comprises a surrounding tube with a gas inlet in said surrounding tube's cylindrical lateral surface and a flame tube in said surrounding tube's central part, wherein said flame tube is concentric in relation to the surrounding tube.

6. The molecular conversion process of claim 5 wherein the flame tube is cylindrical with a free opening through said flame tube's posterior base with a slightly ring-shaped salience wherein said flame tube has a diameter greater than the diameter of the tube attached to the surrounding tube, and wherein the cylindrical wall of the flame tube comprises a plurality of holes of variable diameter.

7. The molecular conversion process of claim 1 wherein the one or more conversion units comprises an electrostatic filter, and wherein the electrostatic filter comprises a container to collect solid particles.

8. The molecular conversion process of claim 1 wherein the converted greenhouse gas is carbon dioxide gas ($CO_2$).

9. The molecular conversion process of claim 8 wherein said $CO_2$ is collected from factory chimney stacks and/or internal combustion engine emissions.

10. A conversion unit for processing one or more greenhouse gases comprising one or more solid particle traps wherein the one or more solid particle traps comprises a first plasma conversion chamber, a second plasma conversion chamber and an electrostatic filter.

11. The conversion unit of claim 10, wherein the second plasma conversion chamber comprises a plasma torch inside a tubular conversion chamber.

12. The conversion unit of claim 11, wherein the plasma torch is of a nontransferred arc type and wherein the tubular conversion chamber is of a direct flow type.

13. The conversion unit of claim 11, wherein the plasma torch is fed by a high current electronic source at a power of 10 to 20 KW.

14. The conversion unit of claim 11, wherein the plasma torch further comprises a high frequency electronic ignitor.

15. The conversion unit of claim 11, wherein the tubular conversion chamber comprises a) a surrounding tube with a gas inlet, and b) a flame tube.

16. The conversion unit of claim 15, wherein the gas inlet is located in the surrounding tube's cylindrical lateral surface and wherein the flame tube is concentric in relation to the surrounding tube.

17. The conversion unit of claim 15, wherein the flame tube is cylindrical with a free opening through said flame tube's posterior base, wherein the diameter of the flame tube is greater than the diameter of the tube attached to the surrounding tube, and wherein the cylindrical wall of the flame tube comprises a plurality of holes of variable diameter.

18. The conversion unit of claim 10, wherein the electrostatic filter comprises a container to collect solid particles.

19. The conversion unit of claim 10, wherein the one or more greenhouse gases is carbon dioxide gas ($CO_2$).

* * * * *